United States Patent [19]

Gundlach et al.

[11] Patent Number: 5,085,615
[45] Date of Patent: Feb. 4, 1992

[54] REDUCING THE DEVELOPMENT OF PALE, SOFT AND EXUDATIVE PORK

[75] Inventors: Larry C. Gundlach, Madison; Paul F. Gould, Waunakee; Gary R. Skaar, Marshall, all of Wis.

[73] Assignee: Oscar Mayer Foods Corporation, Madison, Wis.

[21] Appl. No.: 657,027

[22] Filed: Feb. 19, 1991

[51] Int. Cl.$^5$ ............................................. A22B 5/00
[52] U.S. Cl. ................................... 452/198; 426/321; 426/332
[58] Field of Search ................. 452/198, 141; 426/321, 426/524 X, 262, 327, 332

[56] References Cited

U.S. PATENT DOCUMENTS

| | | | |
|---|---|---|---|
| 4,028,774 | 6/1977 | Allan et al. | 452/198 |
| 4,190,100 | 2/1980 | Wallace | 452/198 |
| 4,219,907 | 9/1980 | Fuller | 452/139 |
| 4,551,338 | 11/1985 | Wallace | 426/281 |
| 4,594,253 | 6/1986 | Fradin | 452/136 |
| 4,659,578 | 4/1987 | Schlegel | 452/198 |
| 4,839,181 | 6/1989 | MacMurry et al. | 452/125 |

OTHER PUBLICATIONS

L. L. Borchert and E. J. Briskey, "Prevention of Pale, Soft, Exudative Porcine Muscle Through Partial Freezing with Liquid Nitrogen Post-Mortem", Journal of Food Science, 1964, vol. 29, No. 2, pp. 203 to 209.

E. J. Briskey, "Etiological Status and Associated Studies of Pale, Soft, Exudative Porcine Musculature", Advances in Food Research, vol. 13, 1964, pp. 159 to 167.

*Primary Examiner*—Willis Little
*Attorney, Agent, or Firm*—Lockwood, Alex, Fitzgibbon & Cummings

[57] ABSTRACT

Freshly killed meat carcasses are processed in a manner by which meat products prepared therefrom do not exhibit the pale, soft and exudative characteristics which are undesirable in meat products. Each fresh carcass is subjected to a conditioning procedure. In that conditioning procedure, at least a portion of the carcass, such as the ham portion of a hog, is slit in order to form a pocket therewithin. In the preferred embodiment, the pocket is formed generally between the primary hind leg muscles of a hog and generally along its femur. Then, a quantity of solid carbon dioxide is inserted into the pocket area formed by the slit, preferably while the carcass is within a meat cooler environment. During the relatively short time that the solid carbon dioxide is fully sublimed, the temperature within the inside and throughout the area treated is reduced. This procedure is accomplished rapidly enough so that the onset of pale, soft and exudative characteristics is substantially prevented.

32 Claims, 4 Drawing Sheets

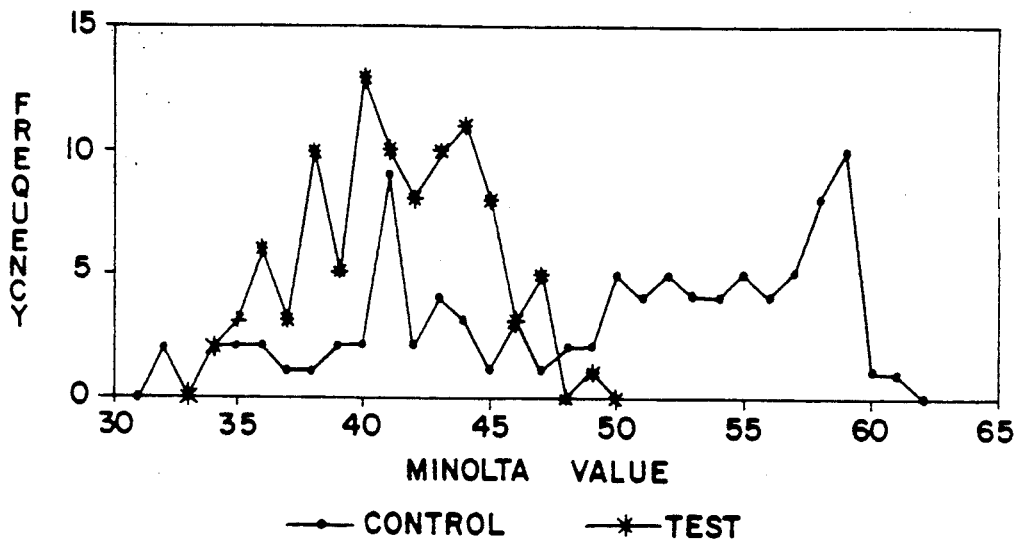
FIG-5-
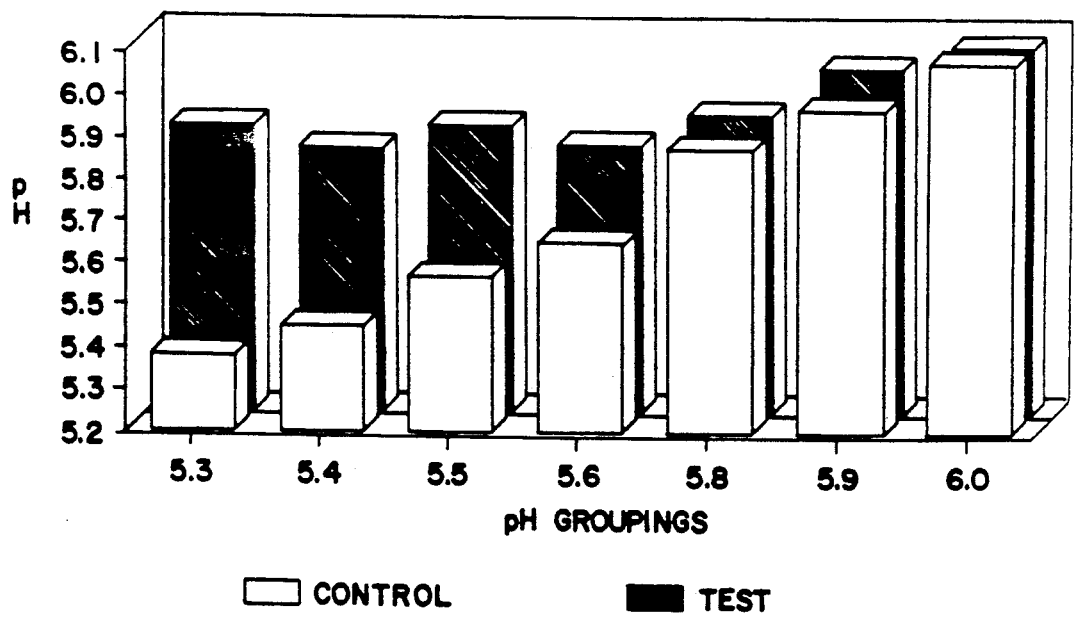
FIG-8-

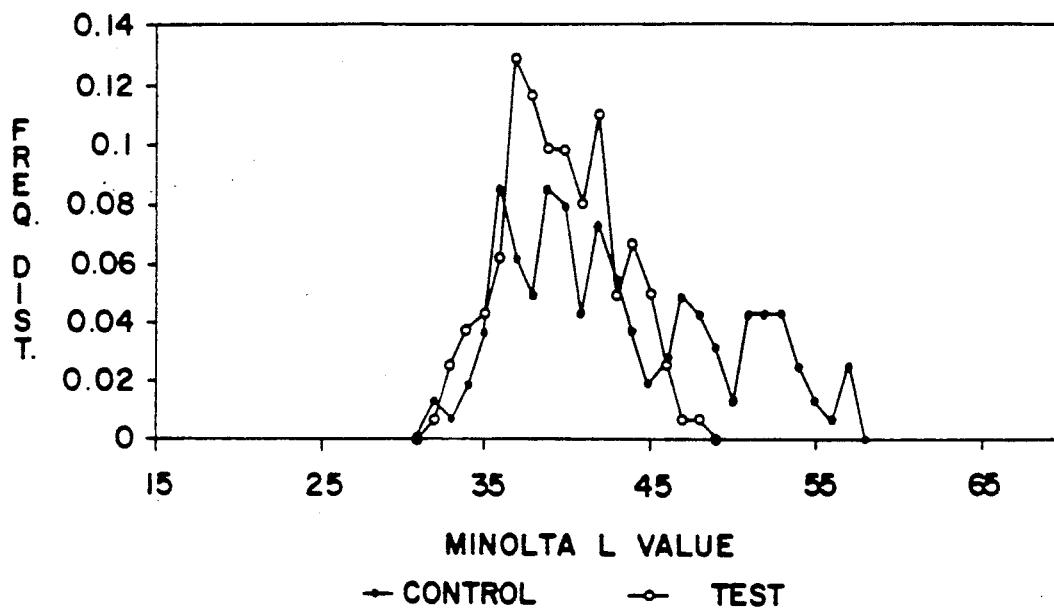
FIG-6-
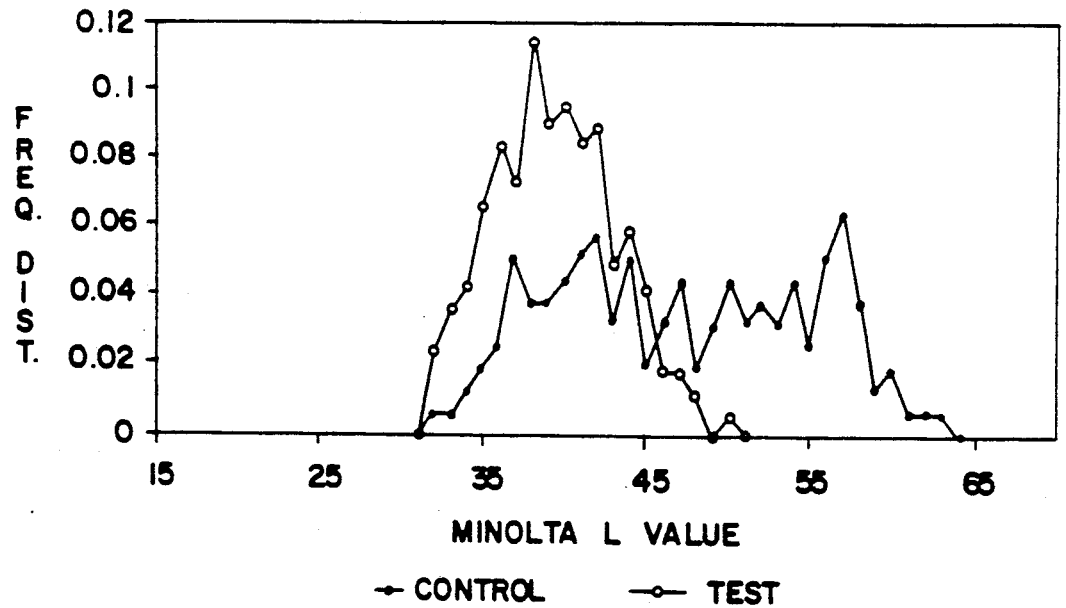
FIG-7-

REDUCING THE DEVELOPMENT OF PALE, SOFT AND EXUDATIVE PORK

BACKGROUND AND SUMMARY OF THE INVENTION

The present invention generally relates to processing of raw meat and especially procedures used during the early stages of slaughtering operations. More particularly, the invention relates to the treatment of pork carcasses during a time period shortly after "stun" and "stick" or killing of the animal whereby the inside areas of thick portions of the animal are rapidly chilled generally prior to the completion of rigor mortis. The procedure involves slitting the ham portion of the carcass to thereby form or gain access to a pocket area within the ham portion and thereafter inserting into the pocket area, or otherwise contacting the inside area with, a quantity of solid carbon dioxide which sublimes and reduces the temperature of this carcass area from the inside and outwardly toward its external surface in order to reduce the incidence of pale, soft and exudative conditions within the pork meat.

It has heretofore been suggested that post-mortem chilling of red meat carcasses can be useful in improving the properties of meat products that are produced from thus treated carcasses. One such prior approach has been to subject the recently killed carcass to high velocity substantially cooled air, such as by rapid chilling with controlled air at a temperature of between about 0° F. and about −30° F. These approaches can include serpentine tunnels or chambers within which cold air is blasted onto the carcass or meat. Other approaches that have been reported are injecting liquid-nitrogen cooled needles into the raw meat to be treated, spraying the raw meat with, or immersing the raw meat within liquid nitrogen or the like.

Exemplary references in this regard include Wallace U.S. Pat. No. 4,190,100 and U.S. Pat. No. 4,551,338, Borchert et al, "Prevention of Pale, Soft, Exudative Porcine Muscle Through Partial Freezing with Liquid Nitrogen Post-Mortem," Journal of Food Science, 1964, Vol. 29, No. 2, pages 203-209, and Briskey, "Etiological Status and Associated Studies of Pale, Soft, Exudative Porcine Musculature," Advances in Food Research, Vol. 13, 1964. The latter two of these references generally discuss that the problem of the development of pale, soft, exudative porcine musculature has long been recognized. It has also been heretofore appreciated by references such as these that previous attempts to address this problem have included temperature-lowering procedures.

The terms "pale, soft and exudative" are generally understood in the art as referring to certain substantially undesirable characteristics of cuts of fresh meat. The pale characteristic refers to a reduction in color intensity of the fresh meat cut. For example, when the fresh meat cut is a ham, good color intensity is one wherein the ham has a darkish pink-to-red color, whereas a pale characteristic is one that is a dull and light grayish pink coloration. Generally speaking, a so-called pale ham is less desirable and is of a lower commercial value than a ham having a more intense coloration. A cut of meat exhibiting a soft texture is one that is not particularly firm. This condition expresses itself in finished pieces of meat such as hams which are difficult to cut into thin slices. The exudative characteristic refers to the inability of the cut of meat to hold water. A pale, soft and exudative (PSE) muscle is one which has a pale color, soft texture, and a reduced capability for holding water. A cut of meat which does not have PSE characteristics has a noticeably darker color and has a firmer texture because the muscle protein is less denatured than a PSE muscle. A muscle that does not exhibit noticeable PSE characteristics also has a greater water holding capacity such that the moisture remains within the meat even when cut, rather than exude therefrom over the passage of time.

A suggestion as to the cause of pale, soft and exudative characteristics is that the lactic acid which is generated in a carcass post-mortem accumulates within the meat components and lowers the pH. This lactic acid generation and pH lowering is believed to cause or at least contribute to the damage or denaturing of the muscle protein, resulting in the appearance of the PSE conditions. It is generally believed that the combination of relatively high temperature and low pH at a time immediately post-mortem or during the onset of rigor mortis contributes to the development of pale, soft and exudative muscle. For example, certain prior work in this area suggests that, in order to substantially prevent the development of pale, soft and exudative muscle, the fresh carcass should be subjected to partial freezing with a cryogenic material such as liquid nitrogen.

By proceeding in accordance with the present invention, it has been determined that the development of pale, soft and exudative muscle in fresh meat carcasses, particularly the ham portion thereof, is reduced without requiring the use of expensive equipment such as liquid nitrogen injector systems, high velocity cold air systems expensive immersion systems and the like. It has now been realized that reducing the development of pale, soft and exudative muscle in pork and the like is achieved by a procedure wherein chilling from the outside is assisted by chilling the carcass area to be treated from the inside out by an approach that is especially uncomplicated and inexpensive. It is also a procedure which can be used within typical, conventional slaughtering facilities without having to substantially modify existing equipment in such a slaughtering facility.

In summary, the present invention utilizes a procedure wherein a thick portion of carcass, especially the ham portion of a pork carcass, is slit such that an incision is made proximate to a seam area generally along the femur in the hind leg portion of the carcass. In this way, a pocket area is formed. For the ham portion, the slit is made in the outside wall to gain access to a natural seam or pocket. Promptly thereafter, in accordance with the preferred embodiment, a quantity of solid carbon dioxide or dry ice is inserted into the pocket, which is then allowed to close. If desired, the contact with solid carbon dioxide can be carried out after the pocket area is fully opened by severing the entire inside ham muscle area to open and expose the surface area along the walls of the cut apart pocket area. The solid carbon dioxide sublimes, at which time the temperature throughout the ham portion is thus reduced to levels at which PSE development is significantly controlled. This temperature reduction occurs within at least about two hours from stun and has been found to satisfactorily reduce the development of pale, soft and exudative musculature within the hams prepared from the thus treated carcass.

It is accordingly a general object of the present invention to provide a procedure for reducing the development of pale, soft and exudative muscle by a fresh meat treatment carried out on a prompt post-mortem basis.

Another object of this invention is to provide an improved freshly killed carcass processing technique wherein thick portions of the carcass are chilled from the inside out, thereby providing carcasses which provide hams and the like that do not experience the onset of pale, soft and exudative characteristics.

Another object of the present invention is to provide an improved procedure for avoiding the development of pale, soft and exudative meat cuts by an approach that does not require any significant capital investment and that can be readily implemented in a typical existing slaughtering facility.

Another object of the present invention is to control the extent of pH reduction which is normally associated with the onset of PSE conditions and, contrary to the general belief that very rapid chilling post mortem will not affect ultimate pH, to minimize such pH reduction by a chilling procedure which follows the specific features of the invention.

Another object of this invention is to provide an improved procedure wherein post-mortem chilling within cooling rooms of typical slaughter facilities is facilitated by adding an inside-out cooling arrangement which cooperates with the external chilling which is carried out within the cooling room.

Another object of the present invention is to provide an early post-mortem chilling arrangement wherein chilling is initiated from the inside by the use of a low temperature component that sublimes into a gas which does not detract from the overall properties of the meat being processed.

Another object of the present invention is to provide packaged ham products which experience reduced water purge and less slice wetness.

Another object of this invention is to provide meat products having improved water-holding characteristics, improved textural characteristics, improved sliceability, and improved color uniformity.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIGS. 5, 6 and 7 report test data comparing color scores for hams processed according to the invention with color scores for hams processed conventionally; and FIG. 8 illustrates the principle of minimizing pH reduction during processing which is exhibited by hams processed in accordance with the invention.

DESCRIPTION OF THE PARTICULAR EMBODIMENTS

Figure 1:
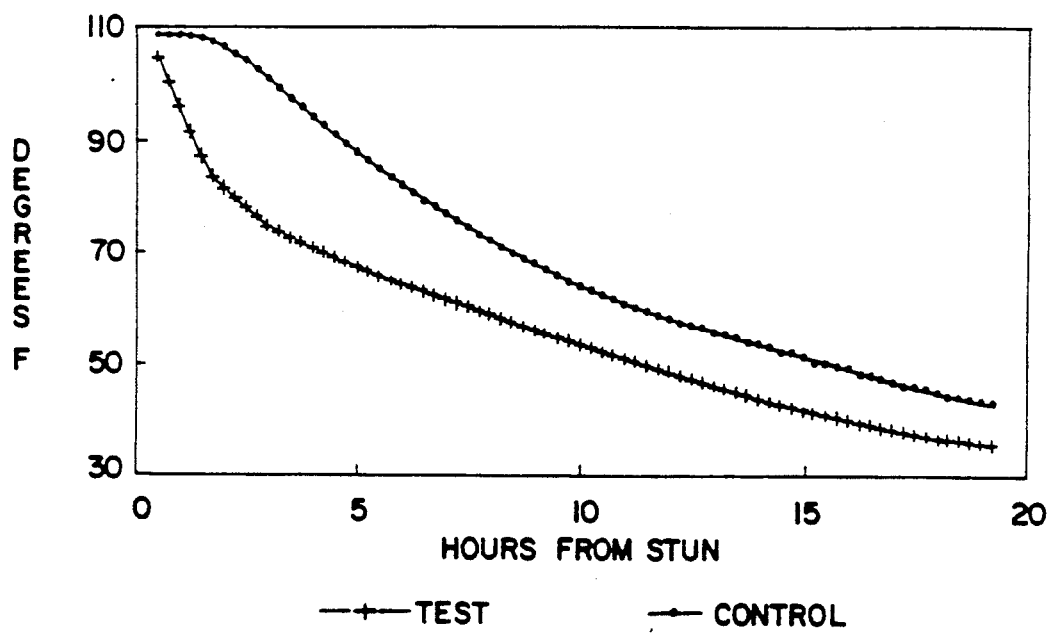
FIGS. 1 and 2 plot data comparing chill rate curves for hams processed according to the invention with hams processed under conventional chilling procedures.

A freshly killed carcass is initially processed in a generally conventional manner wherein it is suspended from an overhead trolley system of a generally known construction. Typically, the carcass is suspended with the hind quarter area near the top of the carcass. Usually, the carcass is within a cooler or chilling room reasonably promptly after stun, usually being on the kill floor for about 35 to 45 minutes. A typical cooler or chilling room in this regard is at a temperature of between about 32° and 40° F. Preferably as soon as possible after stun and proceeding into this chilling room, the procedure in accordance with the present invention is practiced, after which the carcass is processed in the usual and customary manner, for example into finished ham products.

The inside-out component of the preferred embodiment of the chilling procedure carried out according to the invention includes the formation of a pocket within a location of the carcass and the insertion of a solid refrigerant within that pocket. The solid refrigerant then carries out an important component the inside-out chilling which is characteristic of the present invention. It has been found that, in a typical pork hind leg area, solid coolant will be added such that the temperature throughout the inside and outside of the hind leg area of the carcass will be reduced from a typical temperature as high as about 110° F. and usually at least about 100° F. to below about 90° F., typically 88° F. or below within a period of about 90 minutes from stun, usually well within one hour from initial insertion of the solid refrigerant. This temperature reduction is throughout the hind leg area, even into the geometric center of both the inside muscle and outside muscle areas.

The pocket area formed by the preferred procedure in accordance with this invention is formed by slitting the carcass so as to form an incision generally along the femur and at the hind leg muscle area of the carcass. The slit or incision is made with the femur as a guideline, and it opens the carcass generally between the inside muscle of the hind leg area (including the semimembranosis muscle) and the outside muscle thereof (including the biceps femoris muscle). This slit is made in order to gain access to a natural seam or separation between these general muscle areas. A pocket area is thereby formed within the hind leg portion of the carcass, which pocket area will tend to close while the carcass is suspended. When the pocket area is opened, the solid coolant is inserted therewithin, either manually or with the aid of an insertion tool or mechanism or other suitably designed equipment as desired. If it is desired and appropriate, the pocket area alternatively can be fully opened by severing the entire inside ham muscle area to thereby open and expose the surface area along the walls of the cut apart pocket area. The muscles remaining will be chilled by contact with solid carbon dioxide.

The preferred solid coolant is solid carbon dioxide or dry ice. It has been found that such a solid component can be readily inserted into the pocket area, and the inside-out chilling can proceed with the solid coolant tucked firmly within the pocket. The solid coolant may be of a single piece having a size that is especially suitable for insertion within this pocket area. A bar shape is especially suitable, for example one having a generally rectangular shape and a thickness of approximately 1 inch. An especially suitable dry ice bar is about 5 inches in length, about 2.5 inches in width, and has a thickness of approximately 1 inch. It is convenient to vary the thickness in order to adjust the total weight of the solid coolant. A plurality of solid coolant pellets could also be utilized, as could even smaller units thereof such as particles. Particles could be selected which provide a pumpable or generally flowable solid coolant, which can facilitate insertion into the pocket area or coverage of the opened and exposed inside surface of the ham, whether or not the muscle has been fully severed and removed.

With more particular reference to the solid coolant, the quantity or weight added should be less than that which will freeze substantially the entire muscle and enough to effectively lower the temperature and control PSE development as discussed herein. When the solid coolant is carbon dioxide, the weight can vary between about 0.1 and about 3 pounds or more per pocket area. It will be appreciated that weights of ham portions can vary from animal to animal; for example, a typical butcher ham weighs between about 22 and 23 pounds. Cuts having a greater weight would tend to require a larger quantity than a butcher ham, and lower weight hams would tend to need a smaller quantity. It has been found that adequate inside-out chilling is accomplished according to this invention when about 0.3 to about 1.5 pounds of dry ice is utilized within the pocket area of a carcass that provides a typical butcher ham. For example, dry ice bars weighing between about 0.4 and about 1 pound have been found to satisfactorily carry out the procedure in accordance with this invention on hog carcasses used in preparing butcher hams.

The following examples illustrate the procedure according to the present invention.

EXAMPLE 1

A plurality of hog carcasses were processed through a commercial slaughter facility. About 35 minutes after stun, the carcasses were suspended within a cooler having a temperature about 40° F. The hams prepared from these carcasses were divided into two basic groups. The control group ham muscles were processed in the manner conventional for that facility. A substantially equal number of ham muscles from these carcasses were treated with the procedure according to the present invention. A substantially equal number of control hams and test hams were from the right side and from the left side hind leg portions and from the inside and outside muscle portions.

Those hams prepared in accordance with the present invention were processed as follows. The hind leg portion was slit so as to form a pocket between the semimembranosis and biceps femoris muscles. A 0.4 pound bar of dry ice having dimensions of approximately 5 inches by 2.5 inches by ⅛ inch was inserted into each of the thus formed pockets. This was carried out prior to having the carcass enter the cooler and within about 20 minutes from stun. With the carcasses within the commercial chilling room, each carbon dioxide bar sublimed within a carcass pocket. After sublimation for approximately 45 minutes for each carcass, the temperature at the approximate geometric center of the hind leg portions treated in accordance with the present invention was reduced from about 105° F. to about 87° F. or below. The reduced temperature reading was taken with a Data Tracer temperature probe inserted into the geometric center of each right or left ham portion.

Figure 2:
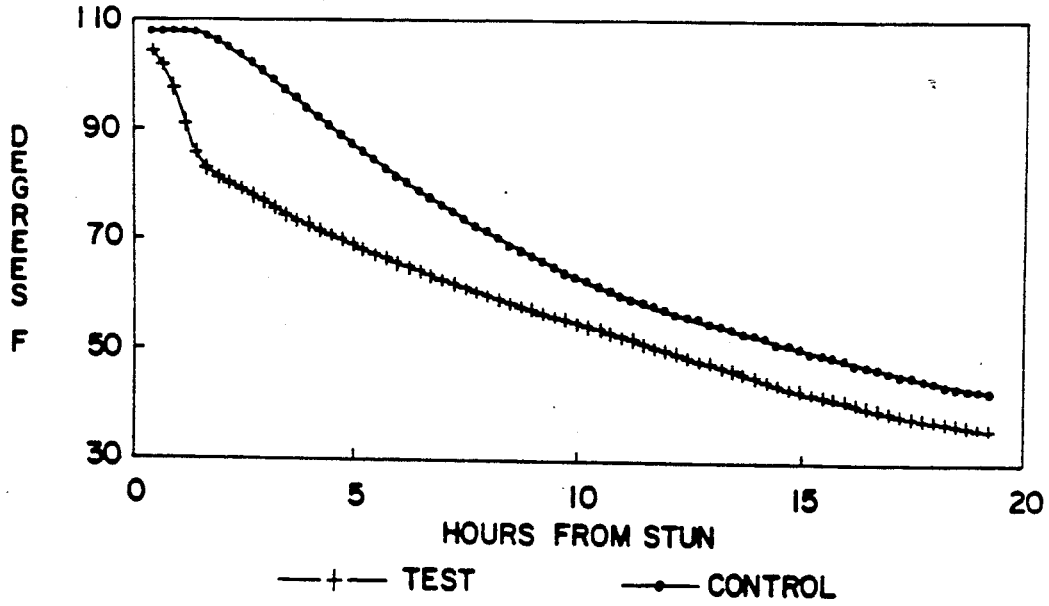
Figure 3:
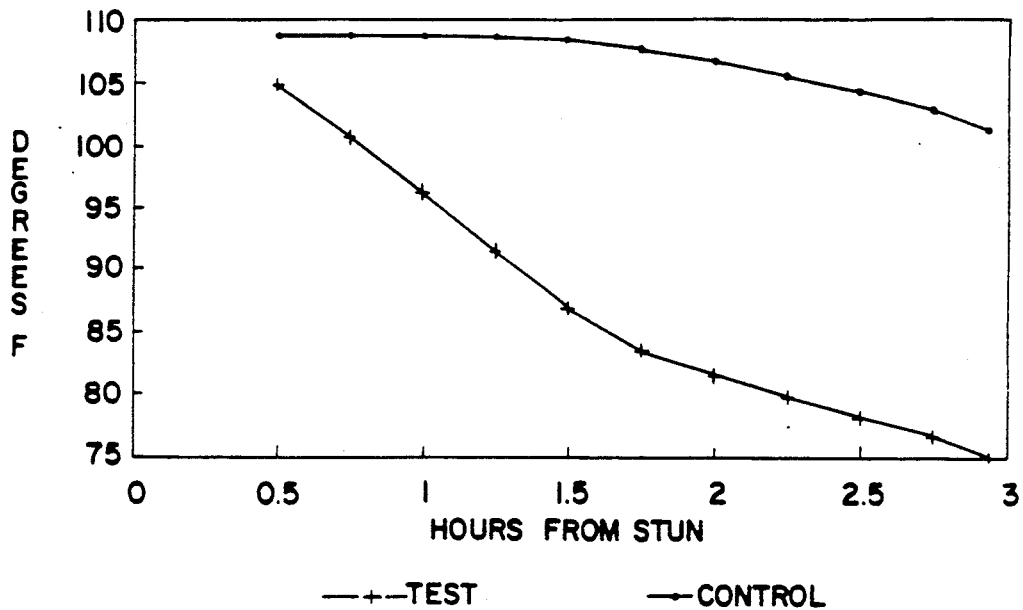
FIGS. 3 and 4 are larger scale plots of the early time data shown in FIGS. 1 and 2, respectively.
Figure 4:
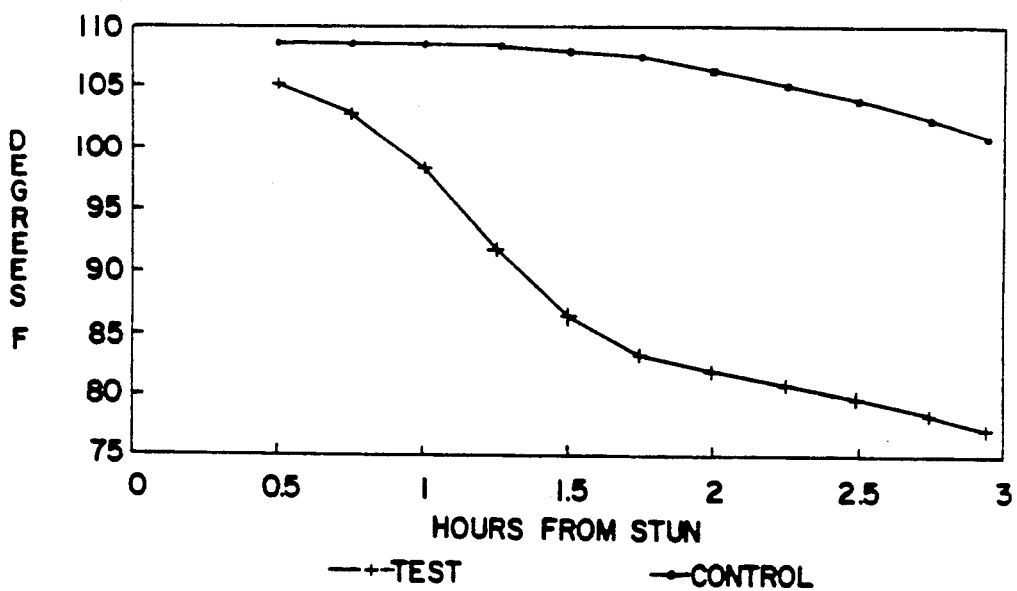

FIGS. 1 and 2 plot the internal ham temperature against the length of time after stun in order to thereby provide an internal ham chill rate curve, the FIG. 1 data being for inside muscles, and the FIG. 2 data being for outside muscles. The control curve shown in both Figures plots average data for hams processed in the same general manner as specified in this Example 1 but without the inside-out chilling procedure specified herein, the Data Tracer temperature probe having been inserted into the geometric center of the whole hind leg portion. The test curves shown plot Data Tracer temperature probe readings of ham portions prepared according to the invention. The data illustrate the rapid temperature reduction advantage attendant to the present invention when compared with normally practiced chilling as shown by the control curve. FIGS. 3 and 4 plot the same data shown respectively on FIGS. 1 and 2 (up to 3 hours from stun) but on an expanded scale in order to better illustrate the substantially enhanced chilling accomplished within the first hour or two after kill when compared with conventional procedures.

When both the control hams and the test hams were boned, the muscles were inspected for the incidence of any pale, soft and exudative characteristics. A Minolta chromameter was used as an objective color gauge instrument. With this device, a light signal is directed toward each ham, and the device measures the extent of light reflected back, thereby generating a numerical readout. It was determined that a reading of 30 gave an especially advantageous dark coloration, while a reading of 65 was deemed to be especially light or pale. Color score values above 52 were determined to indicate PSE muscles.

Data thus generated for the inside ham muscles are plotted in FIG. 5 as Minolta chromameter values (Minolta Value) versus number of hams exhibiting each Minolta L Value (Frequency). The "control" data were taken from 97 inside ham muscles, which were not treated according to the invention, and the "test" data were taken from 98 inside ham muscles which were treated in accordance with the invention. None of the test hams gave a Minolta Value above 52, and only two were above 48. In contrast, 44.9% of the control hams gave a Minolta Value above 52. Other hams, which were tested in substantially the same manner, had 8.2% of their readings above 52. These other hams had been processed through an expensive commercial rapid chill system having a chill tunnel within which cold high velocity air at about −20° F. is directed onto the carcass at between about 500 and 1000 feet per minute.

EXAMPLE 2

Hog carcass processing evaluations generally in accordance with Example 1 were carried out. Solid carbon dioxide bars or blocks weighing between 0.5 and about 0.6 pound and measuring roughly 5 inches by 2.5 inches by 1 inch were inserted within the pocket area of the test hams.

FIG. 6 is a plot of Minolta chromameter values (Minolta L Value) versus frequency distribution for a total of 330 outside ham muscles, 164 of them being control hams treated by the conventional cooler method, and 166 of them being test hams treated in accordance with the present invention. None of the test hams gave a Minolta reading above 48, whereas 23.5% of the control hams gave a Minolta reading above 48. The numerical average reading for the control hams was 42.7 at a standard deviation of 6.3, while that for the test hams was 39.1, at a standard deviation of 3.4.

FIG. 7 is a plot of Minolta L values versus frequency distribution for a total of 324 inside ham muscles, 157 control hams and 167 test hams. One (0.6%) control ham gave a Minolta reading greater than 48, whereas 45.2% of the control hams gave a Minolta reading greater than 48. The average reading for the control inside muscle hams was 46.7, standard deviation 7.7, while the average reading for the test inside ham muscles was 38.8, standard deviation 3.8.

EXAMPLE 3

Testing was conducted which illustrates the ability of the principles of the present invention to control the extent of pH reduction in hog carcasses. Inside ham muscles were cut off from a number of hog carcasses immediately prior to the time the carcasses entered the cooler of a conventional processing facility. Each severed inside ham muscle was then placed on a tray, and solid carbon dioxide pellets were spread on the top of its inside surface, which is the same surface contacted by the solid carbon dioxide when it is inserted into the pocket area of the seam between the semimembernosis and bicepsfemoris muscles. These were identified as the test hams. The ham muscles remaining on the carcasses were processed conventionally within the cooler of the facility; these were designated as control hams. The test hams and control hams were tagged to maintain pairs of hams which originated from the same carcass. Four days post mortem, the pH value of each ham was taken, and data thus generated are reported in FIG. 8 in terms of pH value versus groupings of these pH values. The groupings were selected in order to sort the pH data according to tenths of pH values. For example, the first pH grouping represents control inside ham muscles having pH values which ranged between 5.30 and 5.39. The paired ham data falling within each grouping are reported separately for control and test hams. Again using the example of the 5.3 pH grouping, the test hams from the carcasses falling within this grouping showed an advantageous minimization of a drop in pH values, averaging at approximately 5.87, while the control hams within this grouping showed a disadvantageous pH drop to an average of approximately 5.34.

It will be understood that the embodiments of the present invention which have been described are illustrative of some of the applications of he principles of the present invention. Numerous modifications may be made by those skilled in the art without departing from the true spirit and scope of the invention.

We claim:

1. A method for conditioning freshly killed hog carcasses, comprising:
    supporting a freshly killed hog carcass such that the hind leg portions of the carcass are readily accessible;
    slitting a hind leg portion of the carcass in close proximity to the hind leg muscles generally along the femur of the hind leg portion of the carcass, said slitting procedure forming a pocket area within the hind leg portion of the carcass;
    inserting a quantity of solid carbon dioxide into the pocket area thus formed, said quantity of solid carbon dioxide being at least adequate to reduce the temperature of the hind leg portion and being less than a quantity which freezes a substantial portion of the hind leg portion; and
    reducing the temperature of the thus-treated hind leg portion substantially throughout the hind leg portion within about 1 hour from initiation of said inserting step, wherein sublimation of said solid carbon dioxide contributes substantially to said temperature reducing step.

2. The method in accordance with claim 1, wherein said slitting step is carried out generally between the area of the semimembranosis muscle and the area of the biceps femoris muscle of the hind leg portion.

3. The method in accordance with claim 2, wherein said slitting step accesses a naturally occurring seam area between said muscle areas.

4. The method in accordance with claim 1, wherein said slitting step accesses a naturally occurring seam area within said carcass.

5. The method in accordance with claim 1, further including subjecting the hind leg portion to external chilling conditions at a time generally simultaneous with the temperature reducing step.

6. The method in accordance with claim 1, whereby the slitting, inserting and temperature reducing steps achieve a reduction in the development of pale, soft and exudative musculature within a ham product prepared from the thus-treated hind leg portion.

7. The method in accordance with claim 1, wherein the temperature of said temperature reducing step is about 90° F. or lower.

8. The method in accordance with claim 1, wherein said inserting step and temperature reducing step minimize reduction in pH values of the thus-treated hind leg portion.

9. The method in accordance with claim 1, wherein said inserting step and temperature reducing step substantially retard acid development and minimize reduction in pH values of the thus-treated hind leg portion.

10. The method in accordance with claim 1, wherein said inserting step precedes closing of the pocket area while the solid carbon dioxide is within the pocket area.

11. The method in accordance with claim 1, wherein said quantity of solid carbon dioxide of the inserting step is between about 0.1 and about 3 pounds of more per hind leg portion of a butcher ham carcass.

12. The method in accordance with claim 11, wherein said quantity is between about 0.3 and about 1.5 pound.

13. The method in accordance with claim 11, wherein said quantity is between about 0.4 and about 1 pound.

14. The method in accordance with claim 1, wherein said solid carbon dioxide of the inserting step is a dry ice bar.

15. The method in accordance with claim 1, wherein said solid carbon dioxide of the inserting step is a plurality of pellets or a plurality of generally flowable particles.

16. The method in accordance with claim 1, wherein said inserting step includes flowing a plurality of flowable particles into the pocket area.

17. A method for conditioning freshly killed hog carcasses and for preparing ham products therefrom, comprising:
    supporting a freshly stunned and stuck hog carcass such that the hind leg portions of the carcass are readily accessible;
    slitting a hind leg portion of the carcass in close proximity to and generally between the area of the semimembranosis muscle and the area of the biceps femoris muscle of the hind leg portion of the carcass, said slitting procedure forming a pocket area including a naturally occurring seam area generally between said muscles;
    inserting between about 0.1 and about 3 pounds or more of solid coolant into the pocket area thus formed;

reducing the temperature of the thus-treated hind leg portion within about 1 hour from initiation of said inserting step to achieve a reduction in the development of pale, soft and exudative muscle within the treated hind leg portion; and butchering and curing the thus-treated hind leg portion into a ham product which does not exhibit pale, soft and exudative muscle.

18. The ham processing method in accordance with claim 17, further including subjecting the hind leg portion to external chilling conditions curing said temperature reducing step.

19. The ham processing method in accordance with claim 17, wherein said solid coolant is carbon dioxide inserted at a total weight of between about 0.3 and about 1.5 pound.

20. The ham processing method in accordance with claim 17, wherein said solid coolant of he inserting step is a bar, a plurality of pellets or a plurality of particles.

21. A ham product prepared from a hog carcass, which hog carcass is prepared in accordance with a process comprising:

supporting a freshly killed hog carcass such that the hind leg portions of the carcass are readily accessible;

slitting a hind leg portion of the carcass in close proximity to the hind leg muscles generally along the femur of the hind leg portion of the carcass, said slitting procedure forming a pocket area within the hind leg portion of the carcass;

inserting a quantity of solid carbon dioxide into the pocket area thus formed, said quantity of solid carbon dioxide being at least adequate to reduce the temperature of the hind leg portion therethroughout and being less than a quantity which freezes substantially the entirety of the hind leg muscles;

reducing the temperature of the thus-treated hind leg portion substantially throughout the hind leg portion within about 1 hour from initiation of said inserting step, wherein the solid carbon dioxide substantially contributes to said temperature reducing step; and butchering and curing the hind leg portion into a ham product which does not exhibit pale, soft and exudative musculature.

22. The ham product in accordance with claim 21, wherein the process further includes subjecting the hind leg portion to external chilling conditions during the temperature reducing step.

23. The ham product in accordance with claim 21, wherein the quantity of solid carbon dioxide employed during the inserting step has a total weight between about 0.3 and about 1.5 pound.

24. The ham product in accordance with claim 21, wherein the temperature of said temperature reducing step is about 90° F. or below.

25. A method for conditioning freshly killed hog carcasses, comprising:

supporting a freshly killed hog carcass such that the hind leg portions of the carcass are readily accessible;

slitting a hind leg portion of the carcass in close proximity to the hind leg muscles generally along the femur of the hind leg portion of the carcass, said slitting procedure forming a pocket area within an internal area of the hind leg portion of the carcass;

opening the pocket area so as to sever a ham muscle portion from the hind leg portion and expose said internal area;

contacting a quantity of solid carbon dioxide with the ham muscle portion thus severed, said quantity of solid carbon dioxide being at least adequate to reduce the temperature of the ham muscle portion and being less than a quantity which freezes the entire ham muscle portion; and reducing the temperature of the thus-treated ham muscle portion substantially throughout the ham muscle portion within about 1 hour from initiation of said contacting step, wherein sublimation of said solid carbon dioxide contributes substantially to said temperature reducing step.

26. The method in accordance with claim 25, further including subjecting the ham muscle portion to external chilling conditions at a time generally simultaneous with the temperature reducing step.

27. The method in accordance with claim 25, further including contacting a quantity of solid carbon dioxide with the internal area that has been exposed, said quantity of solid carbon dioxide being at least adequate to reduce the temperature of the internal area while avoiding freezing of substantially the entire internal area.

28. A method for conditioning freshly killed hog carcasses and for preparing ham products therefrom, comprising:

supporting a freshly stunned and stuck hog carcass such that the hind leg portions of the carcass are readily accessible;

slitting a hind leg portion of the carcass in close proximity to and generally between the area of the semimembranosis muscle and the area of the biceps femoris muscle of the hind leg portion of the carcass, said slitting procedure forming an internal area of the hind leg portion of the carcass;

opening the hind leg portion so as to sever a ham muscle portion from the hind leg portion and leave a ham muscle portion generally at said internal area;

contacting between about 0.1 and about 3 pounds or more of solid coolant with the ham muscle portion generally at the internal area;

reducing the temperature of the thus-treated ham muscle portion within about 1 hour from initiation of said contacting step to achieve a reduction in the development of pale, soft and exudative musculature within the treated ham muscle portion; and processing and curing the thus-treated ham muscle portion into a ham product which does not exhibit pale, soft and exudative musculature.

29. The ham processing method in accordance with claim 28, further including subjecting the internal area ham muscle portion to external chilling conditions during said temperature reducing step.

30. The ham processing method in accordance with claim 28, wherein said solid coolant of the contacting step is a bar, a plurality of pellets or a plurality of particles.

31. A ham product prepared from a hog carcass, which hog carcass is prepared in accordance with a process comprising:

slitting a hind leg portion of a freshly killed carcass in close proximity to the hind leg muscles generally along the femur of the hind leg portion of the carcass, said slitting procedure forming an internal area of the hind leg portion of the carcass;

opening the hind leg portion so as to sever a ham muscle portion from the hind leg portion and expose said internal area;

contacting a quantity of solid carbon dioxide onto the internal area thus exposed, said quantity of solid carbon dioxide being at least adequate to reduce the temperature of the ham muscle portion therethroughout and being less than a quantity which begins to freeze the hind leg portion;

reducing the temperature of the thus-treated ham muscle portion substantially throughout the ham muscle portion within about 1 hour from initiation of said contacting step, wherein the solid carbon dioxide substantially contributes to said temperature reducing step; and processing and curing the ham muscle portion into a ham product which does not exhibit pale, soft and exudative musculature.

32. The ham product in accordance with claim 31, wherein the process further includes subjecting the ham muscle portion to external chilling conditions during the temperature reducing step.

* * * * *

UNITED STATES PATENT AND TRADEMARK OFFICE
CERTIFICATE OF CORRECTION

PATENT NO.   :   5,085,615
DATED        :   February 4, 1992
INVENTOR(S)  :   Larry C. Gundlach, Paul F. Gould and Gary R. Skaar It is certified that error appears in the above-indentified patent and that said Letters Patent is hereby corrected as shown below:

Col. 2, line 32, "air systems" should read --air systems,--.
Col. 7, line 42, "he" should read --the--.
Col. 9, line 11, "curing" should read --during--; line 18, "he" should read --the--.

Signed and Sealed this

Twenty-second Day of November, 1994

Attest:

BRUCE LEHMAN

*Attesting Officer*   Commissioner of Patents and Trademarks